Aug. 23, 1949.  C. R. P. STONOR  2,479,704
REMOTE INDICATING SYSTEM
Filed Aug. 4, 1945
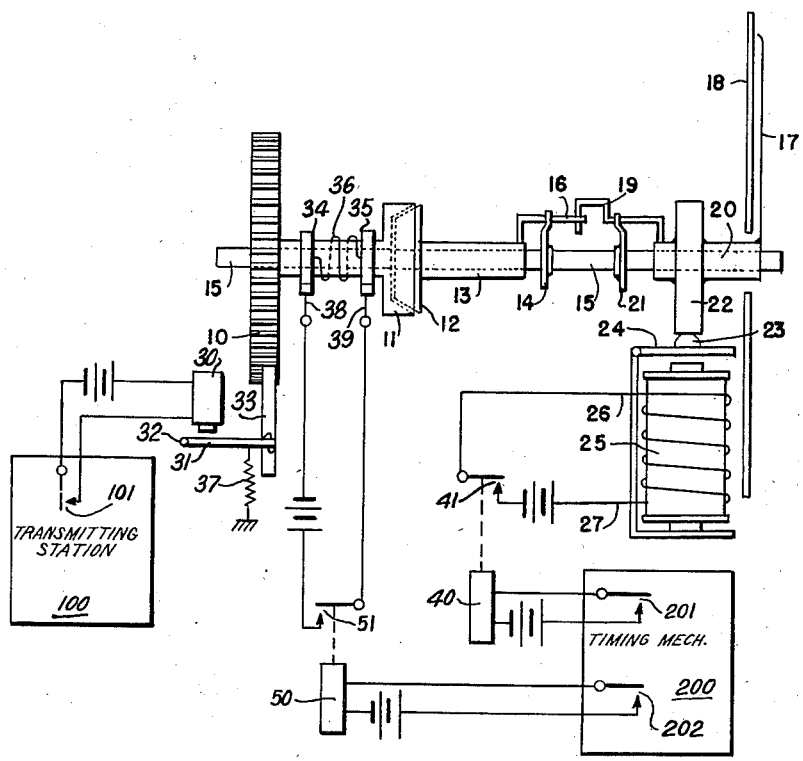
INVENTOR.
CHARLES RICHARD PAUL STONOR
BY
ATTORNEY Patented Aug. 23, 1949

2,479,704

UNITED STATES PATENT OFFICE 2,479,704

REMOTE INDICATING SYSTEM

Charles Richard Paul Stonor, Liverpool, England, assignor to Automatic Electric Laboratories Inc., Chicago, Ill., a corporation of Delaware Application August 4, 1945, Serial No. 608,954
In Great Britain September 13, 1944

2 Claims. (Cl. 177—351)

The present invention relates to methods of indicating electrical quantities at a remote point what are commonly known as telemetering systems and is more particularly concerned with systems for indicating the readings of meters in accordance with the rate of transmission of impulses.

In electric power generation and distribution systems, where remote indication of power readings are often required, use is made of energy meters connected in the various power circuits. From the moving spindle of each energy meter impulses are generated and are transmitted over a line to the point where a remote indication is required, the impulse transmission rate being therefore directly proportional to the average power in the circuit concerned. At the receiving point apparatus is provided for measuring the impulse transmission rate and from this information the average power at the transmitting point can be determined and indicated. The invention is particularly concerned with receiving equipment for responding to the impulses transmitted at the variable rate and for giving an indication of this rate.

It will be understood that to meet operational requirements it is not necessary that the instantaneous power should be indicated nor would this be possible with a system of the type contemplated, but summation of the impulses is made over an appreciable period, for instance half a minute, and the total representing the average power over the period then remains indicated until the beginning of the next period when a suitable adjustment is made in the reading in accordance with the total during the period just elapsed.

According to the invention, in equipment for indicating the value of a variable quantity in accordance with the rate of transmission of electrical impulses from a remote point, the impulses effect the step-by-step operation of a storage member during a suitable summation period at the end of which an indicating member is caused to take up a position corresponding to the setting of the storage member and the storage member is then restored to normal in readiness for setting by impulses during the succeeding summation period.

The invention will be better understood from the following description of one method of carrying it into effect which should be taken in conjunction with the accompanying drawing which serves to indicate in a diagrammatic manner the general principles of a preferred construction.

It will be understood that the timing mechanism 200 shown in block diagram may include any well-known timing device in which the requirements consist of opening and closing electrical contacts at certain predetermined intervals representing periods of time. Contacts 201 and 202 have been shown within the block diagram as being operated by the timing device, in which the closing or opening of the contacts 201 or 202 energize or deenergize relays 40 or 50 respectively.

It will also be understood that the transmitting station 100 shown in block diagram includes an energy meter of any well-known make in which the constant operation thereof closes and opens contacts 101 for energizing and deenergizing magnet 30.

Slip rings 34 and 35 with brushes 38 and 39 have been provided so that the winding 36 of the magnetic clutch 11, 12 may be energized or deenergized, responsive to the operation of contacts 51 by relay 50, during rotation of drive wheel 10.

The energy meter in the transmitting station is assumed to be constantly operating and in so doing, contacts 101 are intermittently closed and opened, thereby completing an obvious energizing circuit for the magnet 30 when the contacts 101 are closed, and breaking the energizing circuit of magnet 30 when the contacts 101 are opened. Magnet 30 will therefore follow the operation of contacts 101 and operate and restore accordingly. Armature 31 of magnet 30 is pivoted at point 32, and has the pawl 33, pivoted on the end thereof, which is continuously engaged with the toothed drive wheel 10. It will be seen that as magnet 30 is energized, the armature 31 is attracted toward the magnet and thereby rotates the wheel 10 one step, due to the action of armature 31 and the pawl 33. When magnet 30 restores, the armature 31 is returned to normal due to the action of spring 37 and the pawl 33 now drops down to engage a new tooth on the wheel 10. Therefore, it may be seen that the wheel 10 is continuously rotated on a step-by-step basis responsive to the operation of magnet 30.

To continue with the present description, it is assumed that the timing device in the timing mechanism has closed contacts 202, thereby completing an obvious circuit to the relay 50. At contacts 51 the operation of relay 50 completes an obvious circuit for energizing the winding 36 of the magnetic clutch 11, 12, which may be of any known type.

When the magnetic clutch 11, 12 is energized, the sleeve 13 will be carried round with the wheel 10 against the restoring force of the spiral spring 14, one end of which is secured to the fixed mounting shaft 15 and the other end of which is secured to the extension arm 16 of the sleeve 13. If the pointer 17 has been previously occupying a zero or low position on the calibrated dial 18, the sleeve 13 in rotating with the wheel 10 will after a small movement engage with its arm 16 against the arm 19 of the pointer sleeve 20 and will so carry the pointer 17 round with it. This movement is made against the tension of the restoring spiral spring 21 but a return movement is normally prevented by an electromagnetically-operated friction brake member including the disc 22 mounted on sleeve 20 and the clamp 23 which normally engages with the disc 22 and which is secured to the armature 24 of the electromagnet 25. Hence in the above condition the pointer sleeve 20 will be rotated by the sleeve 13 with sufficient force to overcome the frictional effect of the clamp 23. If, however, the pointer 17 has been occupying a high position on the dial 18, a greater movement will be necessary before the arm 16, during the rotation of the sleeve 13, engages with the arm 19.

At the end of each summation period the timing device in the timing mechanism 200 closes contacts 201, thereby completing an obvious circuit for energizing relay 40. In operating contacts 41, relay 40 completes an obvious circuit for energizing electromagnet 25 over leads 26 and 27 thus removing the brake 23 from the disc 22 thus allowing the sleeve 20 to rotate backwardly if necessary under the action of the spring 21 until the arm 19 engages with arm 16. Clearly, if arm 16 has engaged with arm 19 during its rotation, no restoring movement of the pointer 17 will take place. In either event the reading of the pointer at this time will be proportional to the average rate of impulse transmission during the preceding summation period. After a suitable short time interval, the timing device in the timing mechanism 200 opens contacts 201, thus opening the energizing circuit of relay 40. In restoring contacts 41, relay 40 opens the circuit to the electromagnet 25, which deenergizes and thus releases the brake 23 to clamp the pointer in the position which it has just taken up.

Shortly after the electromagnet 25 is deenergized, the timing device in the timing mechanism 200 opens contacts 202 and relay 50 is allowed to restore. In restoring contacts 51, relay 50 opens the circuit to the winding 36 of electromagnetic clutch 11, 12, and the clutch is de-energised, thus allowing the sleeve 13 to return to a normal position against a stop (not shown) under control of the spring 14. After an interval sufficient for this to take place, the timing device recloses contacts 202, thereby causing relay 50 to energize and complete the circuit to winding 36 at contacts 51. The clutch 11, 12, is now re-energised, thus permitting the driving wheel 10 again to start driving the arm 16 towards arm 19.

If the rate of impulsing decreases during the next actuation period, arm 16 will fail to reach arm 19, and hence when the time pulse operates the control relays, the pointer 17 will move backwards until the arm 19 engages with arm 16. If the impulse rate increases during this next actuation period, arm 16 will engage with and drive the arm 19 in the latter part of the period and the driving wheel 10 will then rotate the pointer shaft against the action of the brake 23. Under this condition when the timing device closes contacts 201 for operating relay 40 and which in turn closes contacts 41 for energizing electromagnet 25, the pointer will be reading correctly and will not move when the clamp is removed.

Although the invention has been illustrated by a particular embodiment thereof, it should be apparent that numerous modifications may be made therein without departing from the true spirit and scope of the invention as defined in the subjoined claims.

What I claim as new and desire to secure by Letters Patent is:

1. In an indicating system, a driving element, means for continuously moving said element step-by-step, a driven element, a clutch, means for periodically operating said clutch to cause the driving element to move the driven element for a predetermined period of time, an indicator, a coupling between said indicator and said driven element for causing only certain movement of the driven element to move said indicator to an advanced position, spring means normally tending to return said driven element and the indicator to normal, means for holding the indicator in its advanced position against the tension of its spring means after it has been moved to any advanced position, and means for releasing said holding means momentarily at the end of each period to permit the indicator to align itself with the driven element in the position to which it was moved during the periodic operation of said clutch, by means of said coupling or to remain in its same position if such position coincides with that to which the driven element has been moved.

2. In a remote indicating system, a driving element, a driven element, a shaft upon which said elements are rotatably mounted, a clutch device at times linking said elements, an indicating element, an indicator secured to said indicating element, said indicating element mounted upon and free to rotate about said shaft, a stepping device for moving said driving element continuously step-by-step, a coupling element comprising an arm mounted on said driven element and an arm mounted on said indicating element thereby coupling said driven element to said indicating element so that motion received by said driven element is transmitted to said indicating element by means of said arms while independent movement thereof is permitted, and springs in said coupling element mounted on said shaft for exerting force on said arms to normally maintain said arms in engagement with each other.

CHARLES RICHARD PAUL STONOR.

REFERENCES CITED

The following references are of record in the file of this patent:

UNITED STATES PATENTS

| Number | Name | Date |
|---|---|---|
| 2,232,589 | Chappell | Feb. 18, 1941 |
| 2,321,372 | Duncan | June 8, 1943 |
| 2,329,370 | Hicks | Sept. 14, 1943 |
| 2,363,958 | Goodman | Nov. 28, 1944 |
| 2,372,593 | McWhirter | Mar. 27, 1945 |
| 2,384,766 | Orlich | Sept. 11, 1945 |
| 2,384,792 | Brown | Sept. 18, 1945 |
| 2,389,275 | Rayner | Nov. 20, 1945 |